US007594003B2

(12) United States Patent
Davidson et al.

(10) Patent No.: US 7,594,003 B2
(45) Date of Patent: Sep. 22, 2009

(54) CLIENT/SERVER WEB APPLICATION ARCHITECTURES FOR OFFLINE USAGE, DATA STRUCTURES, AND RELATED METHODS

(75) Inventors: James Gilbert Davidson, Reston, VA (US); James Tompkins Ridgeway, II, Falls Church, VA (US); Nathan Robert Folkman, Jersey City, NJ (US); Richard A. Landsman, Scotts Valley, CA (US)

(73) Assignee: AOL LLC, Dulles, VA (US)

( * ) Notice: Subject to any disclaimer, the term of this patent is extended or adjusted under 35 U.S.C. 154(b) by 651 days.

(21) Appl. No.: 11/195,327

(22) Filed: Aug. 2, 2005

(65) Prior Publication Data

US 2007/0033569 A1 Feb. 8, 2007

(51) Int. Cl.
*G06F 15/16* (2006.01)
*G06F 9/44* (2006.01)

(52) U.S. Cl. .................. 709/219; 717/162; 709/228
(58) Field of Classification Search .............. 709/219, 709/228; 717/162
See application file for complete search history.

(56) References Cited

U.S. PATENT DOCUMENTS

| 5,586,260 | A | 12/1996 | Hu |
| 5,870,552 | A | 2/1999 | Dozier et al. |
| 5,872,915 | A | 2/1999 | Dykes et al. |
| 6,023,726 | A | 2/2000 | Saksena |
| 6,055,572 | A | 4/2000 | Saksena |
| 6,067,565 | A | 5/2000 | Horvitz |
| 6,314,492 | B1 | 11/2001 | Allen et al. |
| 6,507,867 | B1 | 1/2003 | Holland et al. |
| 6,687,835 | B1 | 2/2004 | Hirano et al. |
| 6,879,995 | B1 * | 4/2005 | Chinta et al. ............... 709/204 |
| 7,023,838 | B1 | 4/2006 | Hahn et al. |
| 7,203,838 | B1 | 4/2007 | Glazer et al. |
| 2003/0079136 | A1 | 4/2003 | Ericta et al. |
| 2004/0064570 | A1 * | 4/2004 | Tock ......................... 709/228 |
| 2005/0155027 | A1 * | 7/2005 | Wei ........................... 717/162 |

OTHER PUBLICATIONS

U.S. Appl. No. 11/195,284, filed Aug. 2, 2005, Landsman.
U.S. Appl. No. 11/294,182, filed Dec. 5, 2005, Landsman.
Joseph Jaffe, iMedia Connection: The Scoop on ESPN Motion, Apr. 17, 2003, http://www.imediaconnection.com/global/5728.asp?ref=http://imediaconnection.com/content/1163.asp.
Fisher, Darin: Link Prefetching FAQ [online] Mar. 3, 2003 [retrieved on Dec. 7, 2005] Retrieved from the Internet: URL: http://www.mozilla.org/projects/netlib/Link_Prefetching_FAQ.html.
Article entitled "Using Predictive Prefetching to Improve World Wide Web Latency," by Venkata N. Padmanabhan and Jeffrey C. Mogul, date unknown, pp. 22-36, Computer Communication Review.

(Continued)

*Primary Examiner*—Tonia L Dollinger
*Assistant Examiner*—Anish Sikri
(74) *Attorney, Agent, or Firm*—Workman Nydegger

(57) ABSTRACT

Client-server architectures for allowing web applications to operate even when the client and server are disconnected. Exemplary architectures include a local web engine associated with a local cache which can be separate from a browser cache and browser application. Exemplary data structures include web documents having one or more control commands embedded in the head with manifest code. Exemplary methods include operating web applications when the client is offline, caching web applications, executable code, web documents, security code, and/or remote files, allowing web application access of local files, and operating client/web applications.

24 Claims, 8 Drawing Sheets

OTHER PUBLICATIONS

Article entitled "Prefetching Links on the WWW," by Zhimei Jiang and Leonard Kleinrock, date unknown, 7 pgs., Department of Computer Science, University of California at Los Angeles.

Article entitled "The Design and Evaluation of Web Prefetching and Caching Techniques," by Brian Douglas Davidson, Oct. 2002, 329 pgs.

U.S. Appl. No. 11/195,284, filed Sep. 25, 2008, Office Action.

Jaffe, Joseph, The Scoop on ESPN Motion, iMedia Connection: The Scoop on ESPN Motion, Apr. 17, 2003.

About Bits, Platform SDK: Background Intelligent Transfer Service, http://msdn.microsoft.com/library/en-us/bits/bits/about_bits.asp?frame=true; Jul. 2005.

Final Office Action issued Feb. 23, 2009, in U.S. Appl. No. 11/195,284.

Office Action dated Jun. 24, 2009 as issued in U.S. Appl. No. 11/195,284 Aug. 02, 2005.

* cited by examiner

*Figure 4*

```
200 SUCCESS OK
CONTENT LENGTH: 2000
...
COMMAND: CACHE
CODE=       // ad hoc prefetch and caching algorithm. Execution by client may be
<codeBlock>  // made dependent upon successful fulfillment of security conditions.
...
COMMAND: PREFETCH
FetchFILE="foo.domainName.com/path/fetchFile"   // prefetch file to download from server.
                                                // May contain files, web document, data, or
                                                // executable code. Execution by client may be
                                                // made dependent upon successful fulfillment of
                                                // security conditions
...
COMMAND: SourceSECURITY   // authentication information for the server
<source identifier >(+)<version><time stamp+uniquifier><use code>@<domain>
...
COMMAND: UserSECURITY   // authentication requirements for the user to access files in local cache
CODE=
<codeBlock>
COMMAND: EXECUTABLE
CODE=       // code executable or cached by client. Execution may be made
<codeBlock>  // dependent upon successful fulfillment of security conditions
COMMAND: LocalFilesSECURITY
CODE=       // code defines files that web document is allowed to access and
<codeBlock>  // any changes to user interface Document contents
...
<a href = "B.html">
...
```

CLIENT/SERVER WEB APPLICATION ARCHITECTURES FOR OFFLINE USAGE, DATA STRUCTURES, AND RELATED METHODS

BACKGROUND OF THE INVENTION

1. The Field of the Invention

The present invention relates to various client/server web application architectures that provide enhanced features for web applications running on a client.

2. The Relevant Technology

Web applications are accessed by millions of people every day over the Internet. Because of the increased simplicity of developing web applications, web applications have been developed to perform various functions such as providing news content, electronic messaging, audio and visual applications, financial applications, and so on. Typically, a user accesses a web application using a browser application on a client computer. The browser application sends requests to the server hosting a web application to return the desired web document code for display by the browser application. Because a server can respond to thousands of requests almost simultaneously, thousands of users can simultaneously use the web application hosted by the server.

However, because a network can be handling thousands of requests at any given time, users can experience latency in receiving data from the server. Attempts have been made to decrease the latency in network response. One method for reducing latency is to cache or prefetch web documents in a browser cache at the client. However, local caching has historically been most efficient when the web documents are limited to text and graphic content. Furthermore, a browser cache is not secure and thus, caching user-identifiable information such as address auto-complete lists or electronic messages has been discouraged. Another method for attempting to reduce latency in web application operation is to place one or more local proxy servers between the server and the client. A local proxy server stores web document code in cache and returns the web document code to a client upon the client's request. However, again, a local proxy server is most efficient for caching static web pages containing mostly text and images.

Where web applications are increasingly relying on dynamic web content that usually resides at the server, a client must still communicate with a server to access the dynamic web content. Likewise, a local proxy server must still make a request to the server for this information before the local proxy server can return a properly generated web document to the client. When information from the server has been required, e.g., from a database stored on the server, access to information on the server has typically been accomplished by causing a web application to initiate a common gateway interface application at the server. Alternatively, a web application may include script, such as a Java servlet. In these situations where the web application must access information at the server, proper operation of web documents on a client relies on a working network connection between the client and server. Even where a local proxy server exists, when the local proxy server becomes disconnected with the server, it is unable to adequately function to provide a working web site.

Further, in many cases when operating a web application, it is desirable to be able to access local data pertaining to the same digital content that the web application is configured to handle. For example, for a web application that manages digital photo processing, a user would find it beneficial to use the same functionality on digital photos stored locally at the user's computer. However, the user is generally required to upload digital photos to be stored remotely at the server that hosts the web application in order to be able to view and manipulate the digital photos within the web application.

BRIEF SUMMARY OF THE INVENTION

The present invention relates to client/server web application architecture that provides a number of additional features that have not been available heretofore. The client/server web application architecture can operate with a traditional server-client network where a web application is hosted by a server and accessible by the client. Additional features include, but are not limited to, 1) ability of the client to respond to server-side control commands; 2) caching web applications, executable code, web documents, security code, and/or remote files for online and offline usage; 3) allowing access by a web application to local files stored on the client; 4) providing various security measures between server and client interactions and also providing security measures within the client itself while offline; 5) ability to run a web application on the client even when offline while continuing to have access to substantially all of the functionality of the web application; 6) synchronizing local files with remote files; and 7) various other background agents for providing additional functionality that can occur independently of a web application.

Using some or all of these features, the present invention improves web application performance while running on the client. In one embodiment, some of these features are provided by a local web engine on the client that interacts with a browser application and browser cache operating on the client. The local web engine also interacts with an engine cache that can store web applications, executable code, web documents, security code, remote files, and the like. The present invention seamlessly transitions between remote transactions and local transactions without the user being aware of such occurrences. Further, remote files can be accessible locally at the client, and local files can be accessible through a web application. By being able to maintain enough of the web application and/or remote files on the client along with instructions on how to treat certain offline scenarios, the present invention allows a user to operate a web application offline. The present invention then seamlessly synchronizes the remote files stored locally with remote files stored at the server. Thus, the web application is able to essentially run like a client application with access to the client's local files as well as remote files.

The present invention also includes data structures and computer readable mediums for use in performing the above and other functions.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an exemplary transmission data structure for including control commands and manifest code;

DETAILED DESCRIPTION OF EXEMPLARY EMBODIMENTS

Figure 1A:
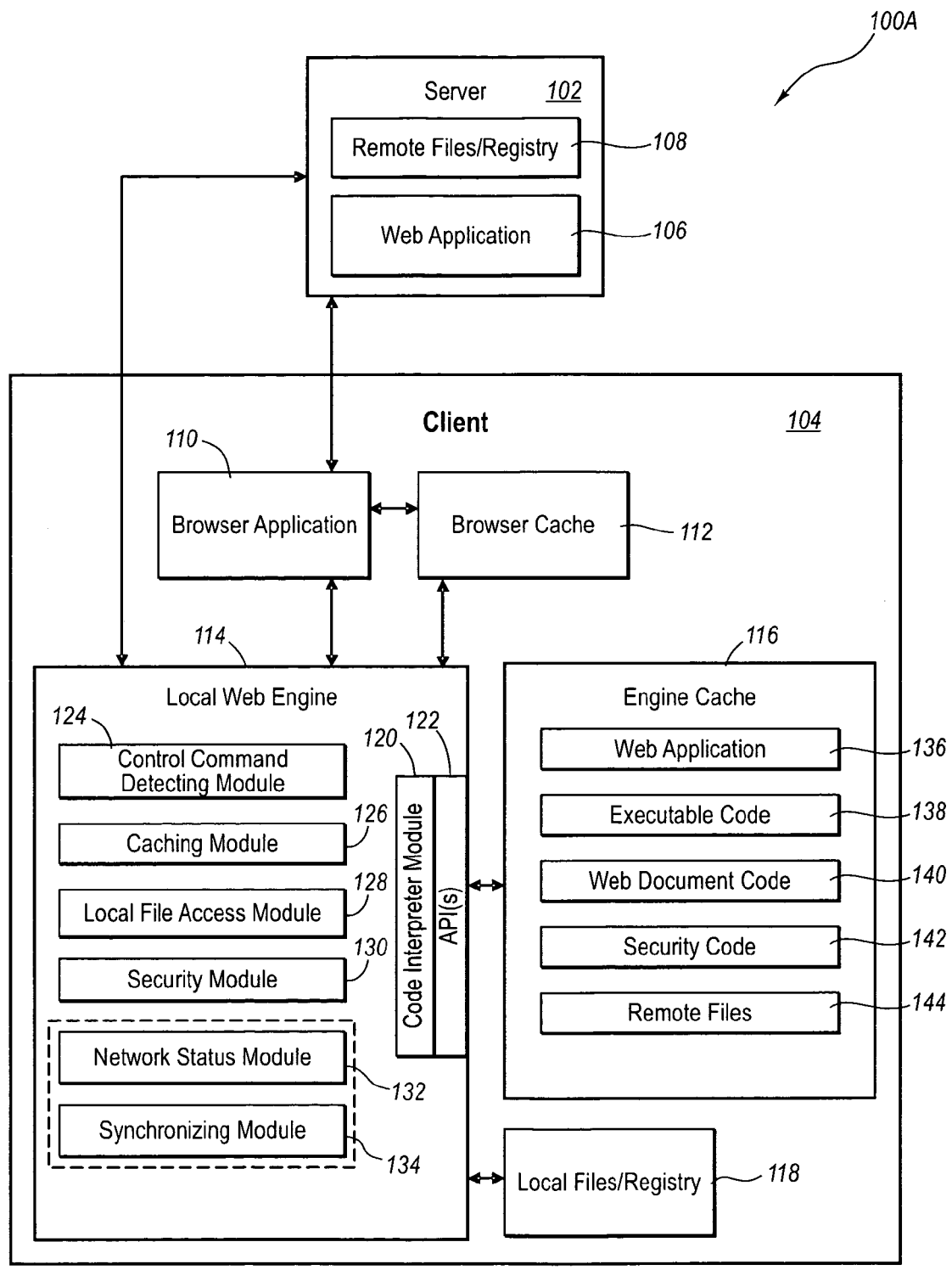
FIG. 1A illustrates an exemplary embodiment of a server/client architecture for offline usage.

The present invention relates to providing improved functionalities for Internet-based client/server applications, or any application in which a client communicates with a server via a remote connection, whether the connection is wired or wireless. With reference to FIG. 1A, an exemplary network system 100A includes a server 102 communicating with one or more clients 104. The server 102 includes a web application 106 and remote files/registry 108 that cooperate to provide the functionalities of a website hosted by server 102. As used herein, a "web application" or "website" refers generally to an entire application code. A web application typically consists of multiple web documents or web pages. Thus, a "web document" or "web page" refers to the amount of code required to generate only a particular web document of a web application. In many cases, the web application 106 is configured to be viewed through a browser application 110 residing on a client 104. Thus, browser application 110 is one means for accessing a website.

In one embodiment, when a client 104 desires to access the website, the client 104 initiates a browser application 110 located on client 104. The client 104 typically inputs a Universal Resource Locator (URL) in an address field that tells the client 104 which server 102 to contact and where to find the corresponding web application 106 located on the server 102. Browser application 110 can then make Hypertext Transfer Protocol (HTTP) requests to server 102 to access a web document. The web document returned by the server 102 typically includes links allowing browser application 110 to request other web documents relating to the same or other web application 106.

Client 104 may also include a browser cache 112 that stores web documents for web application 106 so that when the user selects a particular web document to view, the browser application 110 accesses the web document from browser cache 112 instead of server 102. This can reduce the amount of time for a web document to be displayed and also the amount of traffic on the client's network. However, when using a browser cache 112, the browser application 110 typically defaults to the browser cache 112 instead of the server 102. Thus, it is possible for a user to be viewing an old version of a web document instead of the most recent version. On the other hand, requesting the web document directly from server 102 every single time a web document is displayed on browser application 110 can overload networking connections.

The present invention seeks to overcome these and various deficiencies in web application performance identified above using various novel features which provide more efficient server/client interactions as well as other functions on client 104. In one embodiment, client 104 includes a local web engine 114 that communicates with an engine cache 116. As will be described further below, local web engine 114 is a component residing on the client that includes many additional features which improve client/server interactions. Local web engine 114 is not specific to any particular web application 106. Engine cache 116 is a data storage medium separate from browser cache 112. As will be described further below, local web engine 114 controls situations in which browser application 110 can access engine cache 116, including allowing engine cache 116 and browser cache 112 to exchange or share information.

In one embodiment, local web engine 114 communicates with local files/registry 118. The term "local files" refers to digital content files stored locally at the client 104. As used herein, the term "digital content" refers to any visual or audio content that can be displayed or heard. Digital content can be text files, database files, image files, audio files, or movie files, and the like. The term "registry" refers to a place for maintaining information about the client system such as what hardware is attached, what system options have been selected, how computer memory is set up, and what application programs are to be present when the operating system is started. Server 102 can also include a registry 108.

While various embodiments of local web engine 114 and local cache 116 will be described, generally, in one sense, local web engine 114 includes aspects of a local web server in that local web engine 114 can schedule background processes, coordinate the various processes within the local web engine, and provide a programming environment that allows web-compatible applications to be operated thereon. In this context, the local web engine 114 includes a code interpreter module 120 and one or more application program interfaces (APIs) 122. APIs 122 allow a web application to communicate with local web engine 114. It will be appreciated that local web engine 114 may include an API 122 configured to communicate with various types of digital content—for example, a text application API, a database application API, an image application API, and the like. Alternatively, API 122 may represent a universal digital content API where the same API can be used for various types of web applications or other applications utilizing different digital contents. Thus, local web engine 114 is able to initiate code and also interact with various types of digital contents.

Figure 1B:
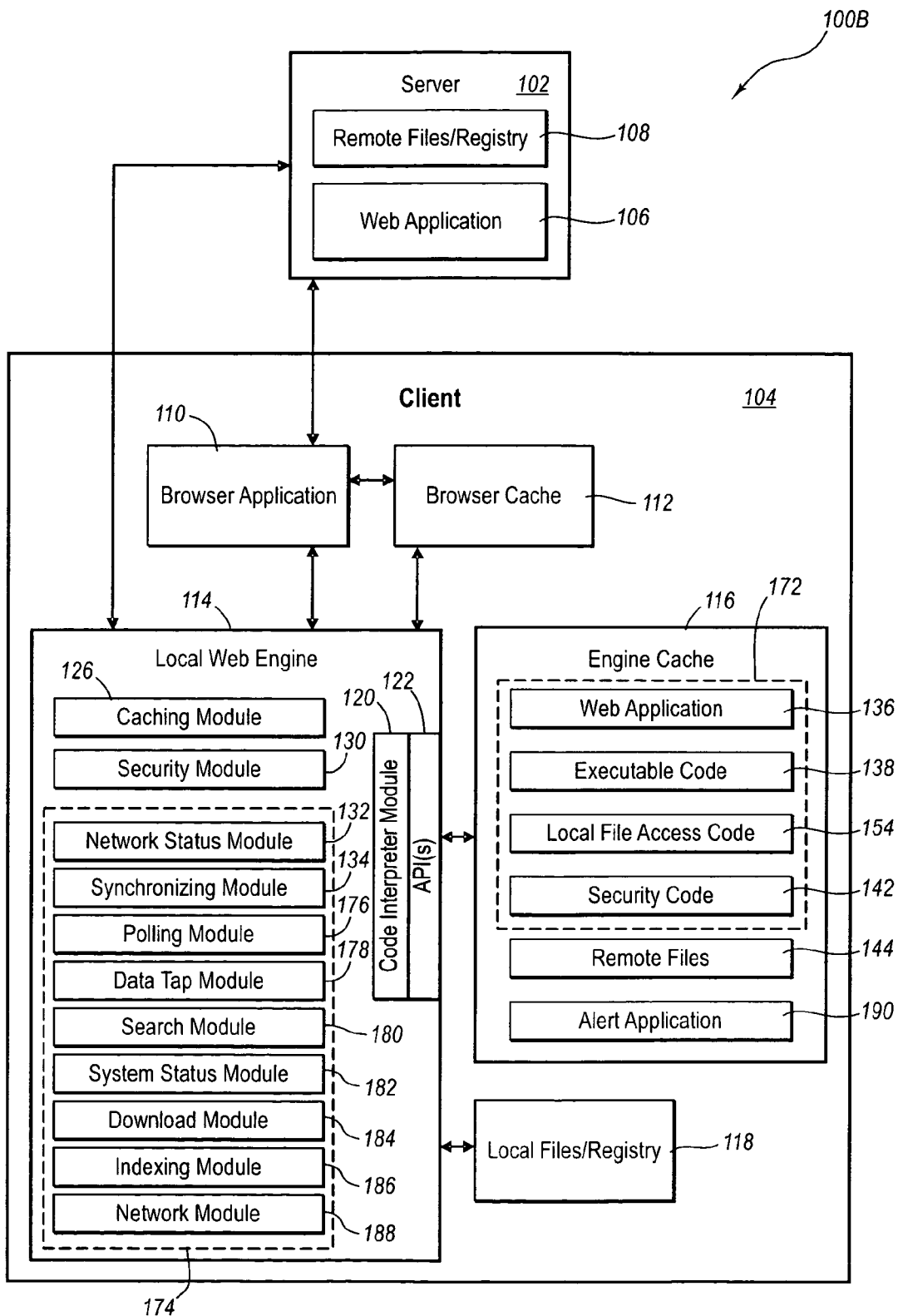
FIG. 1B illustrates another exemplary embodiment of a server/client architecture for offline usage.

However, as depicted in FIG. 1A, local web engine 114 provides additional functionalities beyond what conventional browser applications, browser cache, and local web servers provide. In the embodiment of FIG. 1A, these features include 1) a control command detecting module 124 that can detect control commands embedded in a transmission from server 102; 2) a caching module 126 that stores web applications, executable code, web documents, security codes, and/or remote files; 3) a local file access module 128 that allows a web application or web document, operated from server 102 or client 104, to display and use local files; 4) a security module 130 that allows only authorized web applications to access particular local files and prevents other malicious behavior from outside remote sources as well as maintain secure transactions within the client itself; 5) a network status module 132 that detects the client's offline or online status and adjusts the local web engine 114 accordingly to operate a web application offline; and 6) a synchronizing module 134 that synchronizes remote files stored locally with remote files stored at server 102. In addition, FIG. 1B illustrates additional features which include 7) a polling module for detecting updates from server 102; 8) a search module for performing background searches; as well as other background agents or modules that can be included in the local web engine 114. Each of these features will now be discussed in further detail.

Control Command Detecting Module

In one embodiment of the invention, local web engine 114 improves web application performance and offline usage scenarios by allowing server 102 to provide client 104 with various different commands to change the client's behavior. Control commands are generated at the server 102. For example, a web application administrator or developer could include control commands in the head of a web document. The control commands could, for example, appear as special comments or as special javascript. If the client that receives the web document does not have the ability to detect the embedded control commands, the client ignores the control commands and operates the web page as normal. When control commands are identified by control command detecting module 124, the control command detecting module 124 parses the control command and determines the purpose of the control command. Control commands can be accompanied by additional code, where the control command indicates how to treat this additional code manifest with the control command.

In one embodiment, the control command could be a caching command (see FIG. 4, reference numeral 149*a*) for web application 136, executable code 138, web document code 140, security codes 142, and/or remote files 144 manifest with the caching command. When a caching command is detected, control command detecting module 124 initiates caching module 126 to cache the corresponding code. The cached web application 136, executable code 138, web document 140 and/or security code 142 can be subsequently accessed by the local web engine 114.

Alternatively, the control command could be an execution command to execute web application 136, executable code 138, web document code 140, and/or security code 142 manifest in the control command, either independently or simultaneous with caching said code. Code interpreter module 120 executes the web application 136, executable code 138, web document 140 and/or security code 142 manifested with the execution command.

Additional examples of types of commands will be described herein. In this manner, server 102 is able to direct additional client-side actions to be performed. Optionally, the control command detecting module 124 can be configured to strip the control command and/or any code manifest with the control command from transmissions from server 102.

In one embodiment, detection of control commands is initiated by a user action. For example, a user may access a web document containing a control command. When the web document is received at the client 104, control command detecting module 124 detects embedded control commands therein. In another embodiment, detection of the control commands is initiated by the server 102 without a user action. For example, if a new version of a website is downloaded to a server 102, the server 102 may send an update message to client 104 with an update command, not shown, to update the browser cache 112 or engine cache 116. In addition to an update command, the update message may also include a clear cache command, not shown, to clear the browser cache 112 or engine cache 116 of old code in favor of the new web application. Of course, the user may be required to authorize any change to the client 104.

As illustrated in FIG. 1A, engine cache 116 can be configured to store various types of data—web application 136, executable code 138, web document code 140, security code 142, remote files 144, and the like. Web application 136 may the same or different than web application 106. Web application 136 can be accessed at various times, including, but not limited to, when server 102 and client 104 lose connection. When a user selects web application 136 to be executed locally from client 104, code interpreter module 120 executes the web application 136.

Executable code 138 can be any code configured to perform a particular function that may or may not be tied to a web application 106 or 136 or web document code 140. In one embodiment, executable code 138 is called by a remote web application 106. An example of this is where the executable code 138 provides an alerting function and the remote web application 106 initiates the executable code 138 to alert the user of an event related to web application 106. In another embodiment, executable code 136 is called by a local web application 136. An example of this is code that allows a local web application 136 to function when the client 104 is offline. In yet another embodiment, executable code 138 is called by a process operating on client 104, but not related to a web application 106 or 136.

An example of this is code that alerts the user of an event detected by a background agent running on local web engine 114.

Web document code 140 can be cached upon the command of server 102. In another embodiment, web document code 140 can be cached similar to how browser cache stores web documents and accessed by browser application 110 for substantially the same reasons. Thus, in one embodiment, web document code 140 may be transferred or copied from engine cache 116 to browser cache 112 and vice versa. In another embodiment, enough web document code 140 can be cached to provide a user with enough web pages to navigate a website without requiring that the entire web application 106 be downloaded. This may reduce the amount of memory required to store a particular website on client 104. As discussed above, web document code 140 may operate with executable code 138 in order to function properly when client 104 is offline.

Security code 142 enable server-driven actions to be secure, preventing a rogue application in the browser application 110 from accessing web application 136, executable code 138, web document code 140, security code 142, remote files 144, and/or local files 118. For example, this may be desirable where a web document includes a local file access command (see FIG. 4, reference numeral 149*f*) to allow a web document to access local files. In another example, a source security command (see FIG. 4, reference numeral 149*c*) may be included in the web document to prevent a rogue application from mimicking a valid web application 136, executable code 138, web document code 140, and the like. Security commands will be discussed in further detail with regard to security module 130.

Web application 136, executable code 138, web document code 140 and/or security code 142 can exemplary be separate codes that can be downloaded at the same or different times. Alternatively, web application 136, executable code 138, web document code 140 and/or security code 142 could be part of the same application (see FIG. 1B).

In addition, as illustrated in FIG. 1A, some or all of remote files 108 can be downloaded into engine cache 116 and be stored as remote files 144. As will be described further below, being able to store at least some remote files 144, can assist local web engine 114 in properly operating a web application when the client 104 is offline. It will be appreciated that other code and/or files can be stored in engine cache 116 to implement functionalities taught herein or other functionalities understood by those of skill in the art to be within the scope of this invention.

Figure 2:
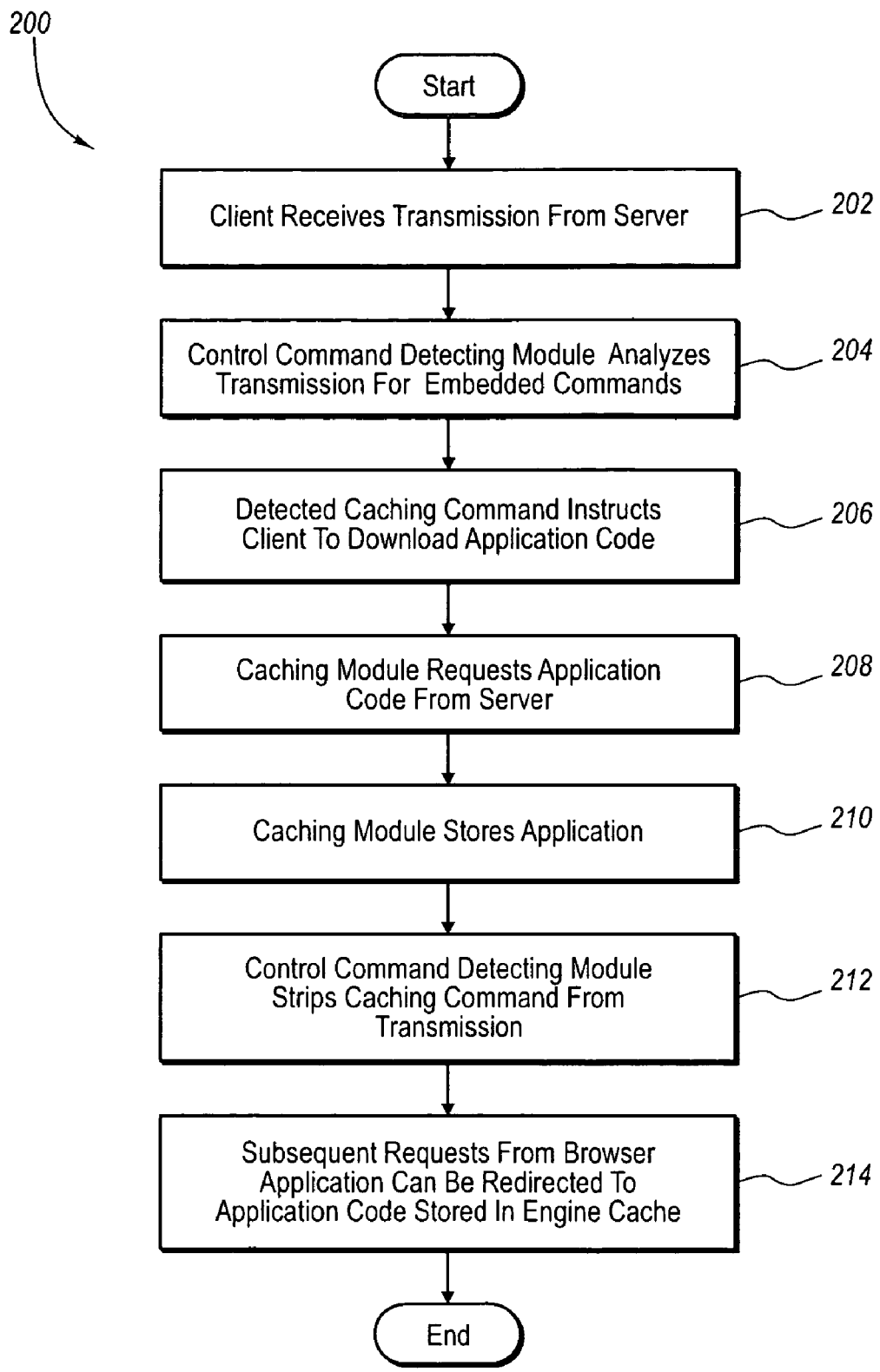
FIG. 2 illustrates an exemplary method for caching application code.

Exemplary methods for caching web application 136, executable code 138, web document code 140, security code 142 and/or remote files 144 will now be described in further detail. FIG. 2 illustrates an exemplary method 200 for storing web application 136. At 202, the client 104 receives a transmission from server 102. For example, the user accesses a website by displaying a web document which can be, but is not limited to, a main or home page. Upon receiving the transmission, at 204, control command detecting module 124 analyzes the transmission for control commands. At 206, control command detecting module 124 identifies a cache command for the client to download web application 136 related to the web application 106. Web application 136 can be the same code as web application 106 or a modified code. In one embodiment, the web application 136 can actually be embedded in the transmission manifest with the cache command. In this case, the caching module 126 can parse the web application 136 from the transmission and download the web application 136 into storage.

Usually, however, the web application 136 is quite large and so, in another embodiment, the caching command can manifest a pathfile at which a downloadable version of the web application 136 is located on server 102 or another server. At 208, caching module 126 requests the identified web application 136 located at the identified pathfile. At 210, server 102 complies with the request for downloading code and caching module 126 stores the web application 136 in storage. At 212, control command detecting module 124 can strip the cache command and associated pathfile and/or web application code from the transmission. If the transmission is a web document, the local web engine 114 sends the web document to browser application 110 for display. At 214, browser application 110 can generate subsequent web documents related to the web application 106 directly from the local web application 136. In one embodiment, all subsequent requests from browser application 110 can be redirected to web application 136 stored in engine cache 116. In another embodiment, redirecting requests from browser application 110 to web application 136 can occur only when the client 104 loses communication with server 102.

Figure 3:
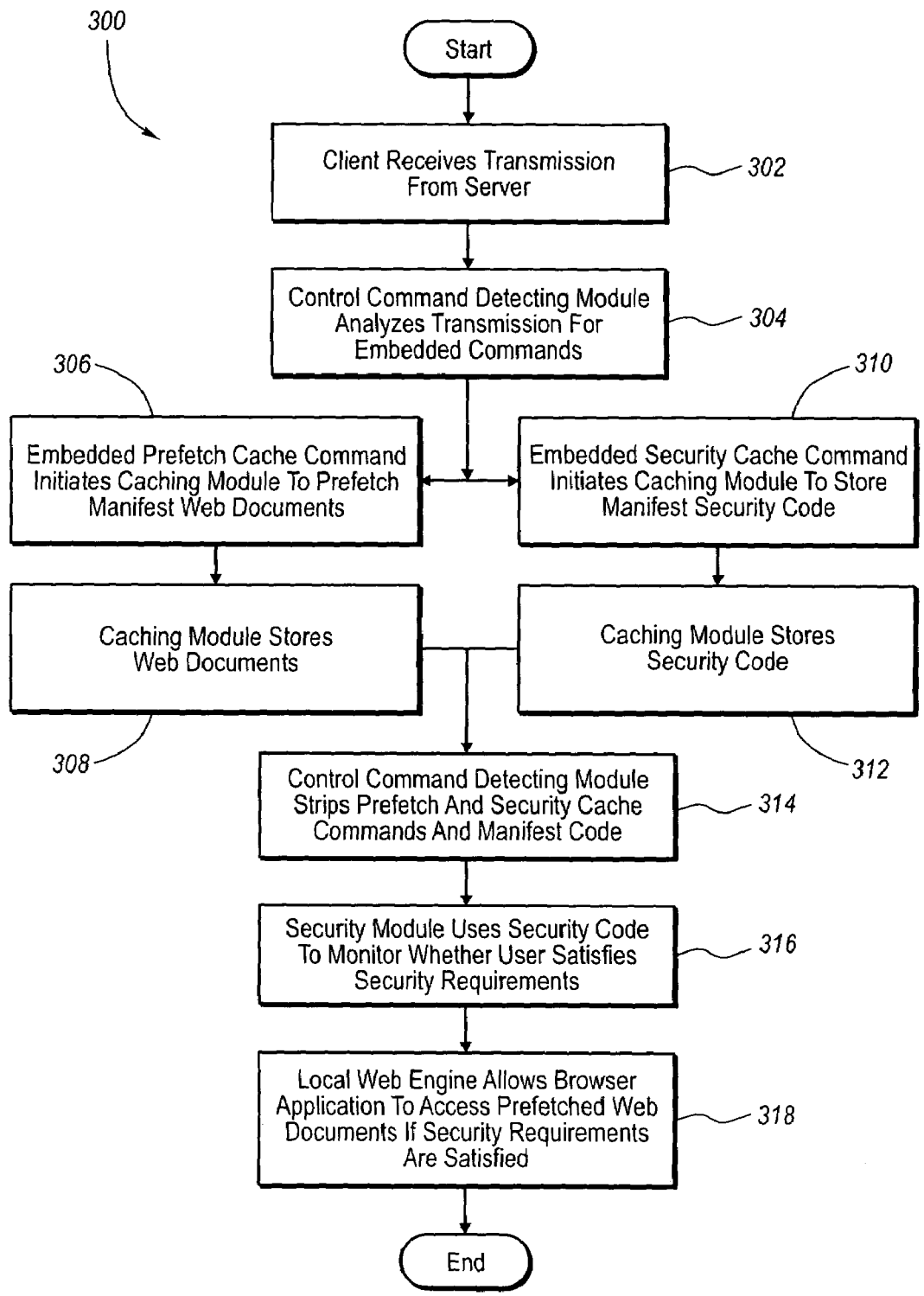
FIG. 3 illustrates an exemplary method for caching web documents and security code.

FIG. 3 depicts an exemplary method 300 for implementing a prefetch caching command and a user security command, thus illustrating the situation in which multiple control commands may be used simultaneously and/or codependently. At 302, client 104 receives a transmission from server 102, for example, a web document such as a home page. Upon receiving the transmission, at 304, control command detecting module 124 analyzes the transmission for embedded control commands. At 306, the control command embedded in the transmission is a prefetching command manifesting web document code 140 to be prefetched. It will be appreciated that the transmission can directly provide the web document code to be cached. Alternatively, the transmission can provide a pathfile from which to request a download of a web page. At 308, caching module 126 stores the web document code 140 manifest with the prefetch command.

Prefetching has been conventionally used to download web documents in advance of viewing those web documents. Conventional prefetching schemes have been limited to downloading only static content such as text and images. However, increasingly, more web documents and web applications are becoming reliant on user input, user authentication, geography, time of day, previous pages viewed by the user, and other dynamically changing information. The present invention provides the ability to prefetch web pages that can include dynamic content that may be viewable only upon certain actions.

Thus, at 310, the embedded control command also includes a user security command to cache user security code manifest with the user security command. The user security code allows a browser application 110 to access the web pages manifest in the prefetch cache command only if a user successfully authenticates herself. At 312, caching module 126 stores security code manifest with user security command in engine cache 116 for access by security module 130.

At 314, the control command detecting module 124 strips both the prefetch cache command and the user security command from the web document and also strips the cached code manifest with each control command. Where the transmission is a web document, local web engine 114 sends the web document to the browser application to be displayed to the user. At 316, the code interpreter module 120 executes the security code 142 in engine cache 116 wherein security module 130 monitor for when the user successfully completes the authentication process. At 318, once the user is authenticated, the security module 130, using the security code 142 stored in engine cache 116, allows the browser application 110 access to the prefetched web documents 140 in engine cache 116.

Conventionally, when a user goes to access private information, such as email, via a web document, the user is normally required to authenticate herself. This may include using a signon and password. Once authenticated, the web application normally loads the Web pages that allows the user to view her private information. However, waiting until after the user has performed the authentication process to download the desired web page can delay the time in which the user is able to access her private information. In the present invention, simultaneous with or even before a user performs an authentication process (e.g., logs in), the web pages holding the user's private information is being stored in engine cache 116. Thus, the prefetching function described in the foregoing exemplary method 300 reduces the amount of time for a user to view a web page.

It will be appreciated by those of skill in the art that the exemplary processes described above with regard to FIG. 2 and FIG. 3 are provided by way of illustration and not by way of limitation and that process elements, steps and/or actions can be rearranged in order, combined and/or eliminated and that other actions may be added due to design considerations depending on the desired functionality that the server 102 will communicate to client 104.

For example, in much the same way that local web engine 114 stores both web document code 140 and security code 142 which can operate together to increase the efficiency and security of web application viewing, local web engine 114 can also cache web application 138, web document code 140, executable code 138 and/or remote files 144 related to the operation of the web application and/or web documents to enable the local web engine 114 to run at least a portion of the web application even when offline. As discussed above, in situations where web documents include dynamic content that may rely on communicating with a server 102 or other outside computer, unless there are additional instructions to operate the dynamic web page offline, the web page will not successfully function. To illustrate this example, an electronic messaging web application may have a dynamic web page that instructs the browser application 110 to send a request to server 102 to check for new mail on a periodic basis (e.g., every 5 minutes). If the server 102 and client 104 are properly connected, the server 102 will respond to the request to check for new mail with any new messages or with no new messages. However, when the server 102 and client 104 are offline or otherwise not communicating, the request to check for new messages will return an error due to the lack of network connection and the user will typically be prevented from accessing any data on the web page.

To overcome this situation, dynamic web pages accessed or cached by client 104 can include caching commands manifesting code relating to how one or more particular web pages are to operate when the client 104 is offline. So, instead of directing the check for new mail request to server 102, the request may be redirected to local web engine 114 to access executable code 138 which will return a "false," similar to a "no new messages" scenario. In this embodiment, the executable code 138 would be reserved only for offline scenarios. Thus, it will be appreciated that FIG. 2 or FIG. 3 could be modified to store web application 136, executable code 138, and/or web document code 140 for offline usage.

Finally, it will be appreciated that web documents can include control commands that do not necessarily relate to the functioning of web documents by a browser application 110. For example, a caching command can be embedded in a web document to cache executable code 138 relating to engine cache 116 behavior. In addition, a caching command can be used to store remote files 108 locally in engine cache 116 as remote files 144. The foregoing discussion of various control commands illustrates that server 102 can deliver active code to the client 104 which is executed outside of the browser application 110.

With reference to FIG. 4, an exemplary transmission 146 is illustrated in which one or more control commands can be included. In one embodiment, the transmission is a web document having a head 147 and a body 148. In another embodiment, a header, not shown, can be added to the web document in a data packet structure. As shown in FIG. 4, various control commands can be included in the transmission 146. Exemplarily, the control commands are embedded in the head 147 of the web document. However, those of skill in the art will recognize that the control commands can be in the body 148 or in a header in a data packet as well as other methods understood to those of skill in the art in view of the disclosure herein.

Control commands can be represented as a new HTML element. Thus, exemparily, the user of the element "COMMAND," in one embodiment, signals the existence of a control command. Those of skill in the art will appreciate that other methods may be used to signal the existence of a control command in a transmission 146 from server 102. While some of the control commands will be discussed further below, exemplarily, head 147 includes a cache 149a, a prefetch command 149b, a source security command 149c, a user security command 149d, an executable command 149e, and a local file access command 149f. Usually, with each control command, a code or pathfile is manifest therewith to provide further instructions relating to the particular command. For example, code block 150 provides code that can be parsed and cached according to cache command 149a. As discussed above, when control command detecting module 124 detects cache command 149a, the module 124 parses the transmission 146 for additional code manifest with the command 149a. Thus, the control command detecting module 124 will detect cache code 150 and use the instructions manifest therein to perform the corresponding function at client 104. In contrast to code block 150, prefetch command 149b includes a pathfile 151 manifest therewith. Thus, instead of getting the code directly from transmission 146, the client 104 can request data located at the identified pathfile at server 102.

Source security commands 149c and user security commands 149d will be described in more detail below. However, these are also manifest with a source security code 152 and a user security code 163. It will be appreciated that executable code can also be manifest with source security commands 149c and/or user security command 149d. Executable command 149e provides code 153 which can be immediately executed at client 104 or cached and later executed. Finally, local file access command 149f provide local file access code 154 provided therewith that defines the types of files that the web application or web document associated with the transmission 146 can access on the client 104.

The body 148 of the transmission 146 includes everything else in the transmission 146. Often, the body 148 includes one or more hyperlinks 164.

Caching Module

As discussed above, in one embodiment of the invention, the local web engine 114 can receive instructions to cache web application 136, executable code 138, web document code 140, security code 142 and/or remote files 144. When such control commands are received, local web engine 114 calls caching module 126 to perform the actual caching function. Caching module 126 thus communicates with engine cache 116 to store the desired item. The caching module 126 may allow local web engine 114 to access various items stored in engine cache 116 to execute one or more items. Further, as discussed above, executable code 138 can be detected in transmissions from server 102 that relate to caching behavior control. For example, executable code 138 may instruct engine cache 116 to create a specific name space for a document or code to be cached, define an expiration date for an existing or cached document to be maintained in engine cache 116, clear a particular name space holding a particular document, and the like. The update command and clear cache command are examples of caching behavior control commands.

In addition, caching module 126 can perform traditional caching functions that can operate in conjunction with browser cache 112. While various embodiments herein describe the caching function being initiated or driven by server 102, caching functions can also be client-driven. For example, caching module 126 can be used to cache static web content, such as text and images, while a user is browsing the Internet. In one embodiment, caching module 126 may have an opportunistic caching function which only stores the most recently accessed web document code 140 and/or remote files 144. Caching module 126 may also compress the information that is being stored in engine cache 116 or browser cache 112. In addition, when a user is downloading a web page, caching module 126 may compare a web page being downloaded with a web page currently stored in engine cache 116 or browser cache 112 to determine if content has changed on the downloaded web page. Caching module 126 assembles the unchanged data stored in engine cache 116 or browser cache 112 and the new data in the downloaded page and allows the browser application 110 to display the assembled version for display on the browser interface.

As will be appreciated, caching module 126 can be programmed with various functions that can accelerate access of content (e.g., coordinating caching, delta encoding, and the like), and may in general include smarter caching algorithms to increase the efficiency of web application functionality.

Local File Access Module

In another embodiment of the invention, the local web engine 114 comprises a local file access module 128 which allows a web application to access local files 118 at client 104.

Conventionally, users have been unable to access local files through a web application except when uploading or downloading information to and from the web application. Otherwise, the user is generally limited to working outside of the web application to use local files. In some applications where the user is allowed to view local files, it is generally done in a separate user interface than remote files and requires the user to switch views between local files and remote files.

Thus, in one embodiment of the invention, a local file access module 128 is provided to allow a web application to integrate local files into the same data structure as remote files. So, from the user perspective, the local files are handled the same as remote files and the user cannot tell the difference between how local files and remote files are accessed. This seamless architecture enhances the user experience by extending web application functionality to local files on the user's computer. Thus, the user can manipulate or maneuver the local files in the same manner that the user would be able to for a remote file, merging the web application into a client application.

The local file access module 128 includes, but is not limited to, enabling local file access code that interacts with a web application to allow the web application to access data files locally. The local file access module 128 is generic so that any web application configured to allow this functionality can interact with local file access module 128. Generally, the local file access module 128 detects or calls local file access code within the web application itself or stored elsewhere to alter the path of data retrieval for a browser application 110. Thus, the user can have access to both remote files and local files and can manipulate or maneuver the local files the same way the user can with remote files.

Figure 5:
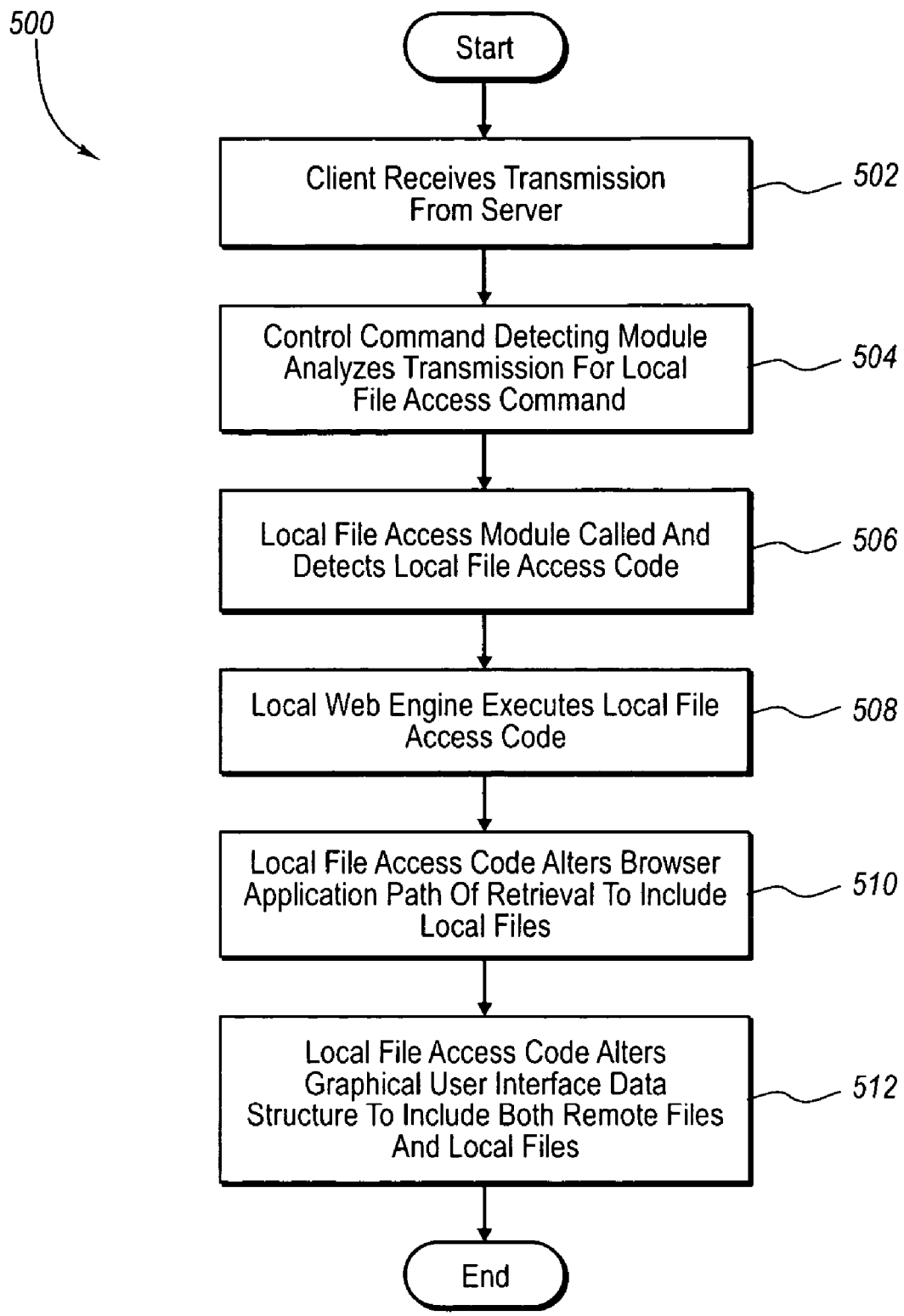
FIG. 5 illustrates an exemplary method for allowing web applications to access local files at the client.

FIG. 5 illustrates an exemplary method 500 for implementing the local file access module 128. At 502, client 104 receives a transmission from server 102. For example, a user accesses a web page which allows a user to view remote files 108 on server 102 (the web page can be executed remotely or locally). For example, a photo management application may present various electronic folders for allowing a user to organize digital photos based on dates the photo was taken, date the photo was stored to remote files, title, event and the like. At 504, the control language detecting module 124 monitors the web page for a local file access command (see, e.g., FIG. 4, reference numeral 149*f*). When a local file access command is identified, at 506, local web engine 114 calls local file access module 128, which identifies the location of local file access code that will allow the web application to incorporate local files into the same graphical user interface in which the remote files are displayed. The local file access code may exist in the web page accessed by the user (see FIG. 4, reference numeral 154), may reside at server 102 or may reside at client 104 as executable code 138. At 508, code interpreter module 120 executes the local file access code.

At 510, the local file access code alters the path of data retrieval for browser application 110 to include data stored in local files 118. That is, a fetch command for data from the browser application 110 is sent to both remote files 108 and local files 118 which respond with corresponding data. For subsequent access by the user for local files displayed in the browser application 110, the local file access module 128 instructs the browser application 110 to direct the request to local files/registry 118 rather than the server 102.

At 512, the local file access code may also alter the graphical user interface for the web page. For example, a graphical user interface data structure for displaying remote files can be altered to additionally display local files. With the local file included in the same data structure as the remote files, local file access module 128 allows the web application to apply web-based functionality to local files. Thus, the above example of a web application for photo management and processing that has various electronic folders to store remote digital photos may now include one or more electronic folders for organizing local files.

The user can further be able to use web application functionality on local files the same as it would for remote files. For example, when handling photo files remotely, the web application may create a small thumbnail file for the image and make the thumbnail available on a web page to drag, drop, rearrange, alter the image, and the like. Using local file access code, the web application can perform the same functions on local files. Sorting functions can also be applied to both remote files 108 and local files 118. Utility of the local files in the web application is independent of whether the user is going to upload files or not to the server 102. Thus, once the local files are included in this data structure, the local file access module 128 allows the web application to handle the local files in much the same manner as it would for remote files. However, if the user later decides to, for example, order a print of a local image file, the user would have the option of uploading the local file to the server 102 for photo processing.

It will be appreciated by those of skill in the art that the exemplary processes described above with regard to FIG. 5 are provided by way of illustration and not by way of limitation and that process elements, steps and/or actions can be rearranged in order, combined and/or eliminated and that other actions may be added due to design considerations depending on the desired functionality that the local file access module 128 is desired to have.

The local file access module 128 is data generic and can allow any web applications to access local files, upon satisfying certain conditions. For example, the above method can be applied to electronic messaging web applications. When a user opens a web email application, the user generally has various electronic folders for storing electronic messages such as inbox, sent, bulk, draft, archived, and the like. With the local file access module 128, the user may now see one or more folders for locally stored electronic messages which the user can use or manipulate just like remotely stored electronic messages.

Another context in which the local data access module 128 becomes useful is in combining remote and local searches. As will be discussed below, a web application can be configured to perform remote searches and local searches by combining a remote search application with a local search application. The local searches can be stored in local files 118. When a user accesses a particular website configured to show remote and local searches, the website can include executable code on the web page or stored in engine cache 116 that causes the website to access recent search requests and/or results—both remote and local. The local search results can be combined in the same graphical interface or data structure as the remote search results.

As can be seen, the local file access module 128 has the potential to allow web applications to access local files in an unrestrained manner. That is, photo processing applications could potentially access other types of digital content such as text files, database files, and the like, that are irrelevant to the web application's functionality. In addition, a user may have one or more folders of digital content that they do not wish to have accessed by any application with network functionality. Not only does this present security concerns, but it also hampers the user's ability to find local files that they are truly interested in finding. While security measures will be described more fully below with regard to security module 130, in one embodiment, security measures may be implemented to ensure that only authorized web applications are allowed access to the client's local files. Security measures may additionally be used to limit the type of files and/or location of files that a web application can access.

Security Module

In one embodiment, security codes can be implemented at various steps along the process for executing a web application on a client 104. First, security codes can be implemented to allow web application 106 or 136, executable code 138, and/or web document code 140 to access local web engine 114. In this sense, a security code can be a marker, indicator or tag that local web engine 114 uses to identify and authorize an incoming web application, executable code, and/or web document as being sent by an authorized third party. When server 102 sends a web application, executable code, and/or web document, a security code (see, e.g., FIG. 4, reference numeral 152) is incorporated into the transmission, which is then sent to client 104.

At client 104, security module 130 detects the security code in the incoming transmission, security module 130 of local web engine 114 evaluates the incoming transmission to determine (1) the existence of a security code, (2) whether the security code is authentic; and (3) whether the security code is valid. Once a local web engine 114 authorizes an incoming web application, executable code, and/or web document containing the security code, the authorized web application, executable code, and/or web document is allowed access to local web engine 114 and may be cached in engine cache 116 and/or browser cache 112. If no security code is included in the incoming web application, executable code, and/or web document or if the security code is determined to be not authentic or invalid, the local web engine 114 may allow the web application, executable code, and/or web document to interact with browser application 110 to the extent that, for example, a web application hosted by server 102 could normally interact with browser application 110. However, the unauthorized item will only have limited access or no access to functionalities provided by local web engine 114.

With reference back to FIG. 4, transmission 146 additionally includes source security command 149c which instructs the local web engine 114 to evaluate the manifest source security code 152 embedded in the head 147. The source security command 149c and source security code 152 are generated at server 102. The source security code 152 generally includes a server identifier portion, an authentication portion and a validation portion. It will be appreciated that the same alphanumeric code can be used for one or more purposes. The example of source security code 152 in FIG. 4 represents only one way of implementing the security codes and any of a variety of other techniques can be used. Further, it will be appreciated that a source security command 149c does not necessarily have to accompany source security code 152. That is, the mere existence of source security code 152 may serve as a signal to local web engine 114 to initiate security measures.

Exemplarily, the source security code 152 includes a server identifier 156, a version indicator 157, a time stamp 158, a uniquifier 159, a use code 160, an authentication code 161, and the domain identifier 162. The server identifier 156 serves to identify the particular server from which the incoming web application, executable code, and/or web document is sent. The server identifier 156 can be, e.g., the server IP address. The version indicator 157 is typically a one character version indicator that indicates the version of the security code. The time stamp 158 indicates the time that the security code was generated and can be based on server's geographic location. The uniquifier 159 is typically an unsigned integer that is unique for each security code generated on a particular server 102 in the same second. The use code 160 is an encrypted value which identifies the use basis of a particular security code, as will be described in further detail below. The authentication code 161 is an encrypted value which verifies the source and/or integrity of the security code, as will be described below. In this embodiment, the time stamp 158, uniquifier 159 and use code 160 are used for validation purposes while the authentication code 161 is used for authentication purposes. This example illustrates that authentication portions and validation portions are separate, while in other embodiments, they may be combined in a single portion of the source security code 152.

As discussed above, the source security code 152 includes one or more authentication codes 161 for performing one or more authentication technique. Authentication techniques may include, but are not limited to, checksum algorithms such as, but not limited to, Cyclic Redundancy Check algorithms, CRC-8, CRC-16, and CRC-32; hashing algorithms such as, but not limited to, MD2, MD4, MD5, and Secure Hashing Algorithm (SHA); digital signature algorithms such as, but not limited to, digital signature algorithm (DSA) and digital signature standard (DSS); symmetrical encryption algorithms such as, but not limited to, Message Authentication Code (MAC) algorithms, RC2, RC4 and the Data Encryption Standard (DES); and combinations thereof. Those of skill in the art will appreciate that any authentication method can be used that incorporates or builds upon any of these methods as well as other authentication methods known in the art or that will be developed.

Many of the authentication techniques require knowledge of public keys and/or private keys by either server 102 and/or client 104 to encrypt or decrypt the authentication code 161 in the source security code 152 as well as for other uses that may be associated with handling a security code, depending on the nature of the encryption. Keys for authenticating security code 142 may be stored at server 102 in remote files 108 and/or client 104 in local files 118. In one embodiment, a certificate authorizing agency can serve as a certificate authorizing source for sharing public keys.

As used herein, "validation" refers to any steps related to ensuring that the security code is used appropriately. That is, even if the source security code 152 is authentic, it may not necessarily be valid. Validation portions of source security code 152 allow security codes only to be valid for a specified period of time or for a single or limited number of uses. A particular source security code 152 can be configured to have a particular usage. For example, a specified security code may be generated based on a single-use, multiple-use, or timed-use basis. Use code 160 contains the information so that the client 104 can ascertain the defined usage for each source security code 152. A common coding can be used among server 102 and client 104 so that server 102 and client 104 will consistently observe the same usage rules. As such, a small coding file may be placed on the remote files 108 and/or local files 118 for each server and/or client to reference. However, such a coding file has a minimal footprint and avoids the need for a larger table to be stored for each security code. Further, the client 104 may store additional information to ascertain whether a security code is valid.

In one embodiment, validation is based on the time stamp 158, uniquifier 159 and use code 160 features of the source security code 152 shown in FIG. 4. The time stamp 158 and uniquifier 159 can be generated using an 11 character base64 encoding of the time stamp and uniquifier. The use code 160 can be an encrypted alphanumeric code which symbolizes a particular use. The use code 160 can be encrypted using any of the methods described above for authentication codes 161 or any other encryption method. The validity of security codes that are valid only for a specified period of time can be determined by directly examining the content of the security codes. Another option is for certain security codes to be valid under conditions that combine use-based rules and time-based rules. For example, a security code can be valid for a single use and for a certain amount of time, meaning that if either condition fails, the security code is invalid.

An exemplary process for evaluating source security code 152 in a transmission from server 102 is described in further detail in co-pending U.S. patent application Ser. No. 11/080, 240, filed Mar. 15, 2005, and entitled "Electronic Message System With Federation of Trusted Senders," which disclosure is incorporated herein by reference in its entirety. When a server 102 prepares to send an incoming web application, executable code, and/or web document, server 102 generates the source security code 152 to be sent with the web application, executable code, and/or web document. Generally, the source security code 152 can be placed in any part of the incoming web application, executable code, and/or web document.

When client 104 receives the transmission, security module 130 at the client 104 analyzes the incoming web application, executable code, and/or web document to determine whether or not it is an authorized transmission. The security module 130 determines if incoming transmission contains a source security code 152 somewhere therewith. The security module 130 authenticates the source security code 152 using any of the various methods described above for constructing authentication codes 161. For example, using a private key, the security module 130 could regenerate a checksum and verify that the regenerated checksum is the same as the checksum in the source security code 152. If the checksum in the source security code 152 is the same as the regenerated checksum, this indicates that the security code is authentic, i.e., was generated by the server 102.

If the security code is authentic, the security module 130 determines whether that particular use of the security code is valid by evaluating use code 160. The security module 130 may access local files 118 to determine if there have been any prior uses of the particular security code.

On a similar note, in another embodiment, one way in which security is implemented is to separate the browser application 110 and browser cache 112 from the local web engine 114 and engine cache 116 and allowing only permissioned access therebetween. In this manner, any web application 136, executable code 138, web document code 140, security code 142, and/or remote files 144 stored in engine cache 116 will not be accessible to browser application 110 until an event occurs in which the local web engine 114 allows access to the stored item in engine cache 116. For example, where the user is required to authenticate herself before accessing certain web document code 140 that is stored in engine cache 116, user security code 163 can be provided preventing browser application 110 access to these web documents until the security code is satisfied. In this embodiment, user security command 149d manifests an exemplary user security code 163. User security code 163 is cached and associated with user signons. User security code 163 can be the same algorithm that server 102 uses to determine whether a user signon was authentic. User security code 163 also directs an authentication request from browser application 110 to local web engine 114 instead of server 102.

As discussed above with reference to FIG. 3, allowing access to information in engine cache 116 can require storing user security code 163 in engine cache 116 and having security module 130 use the user security code 163 to authenticate a user signon. Thus, in one embodiment, user security code 163 represents executable code containing instructions on when an application can access certain information contained in engine 116.

During offline scenarios, user security code 163 and security module 130 can operate to maintain secure access to information stored in engine cache 116 similar to how a server 102 would maintain access to remote files 108. For example, when a user is required to authenticate herself, the client 104 and server 102 will normally go through an encryption and/or decryption process at both ends in order to ensure that the user is legitimate. Similarly, when the client 104 is offline, the local web engine 114 can maintain the algorithms as executable code 138 separate from those used to encrypt/decrypt the user input in order to verify that the user has legitimate access to the information stored in engine cache 116. It will be appreciated that FIG. 6 can be modified to include redirection of sign on authentication when client 104 is offline.

In another embodiment, a local file access command 149f manifesting local file access code 154 can be implemented to prevent web application, web document, and/or executable code from unrestrained access to local files 118. Local file access code 154 stored at engine cache 116 can be used to determine to which digital content or locations of digital content, to which a web document may have access. The file access code 154 can be detected when the local web engine 114 initially makes contact with a website. Alternatively, the file access code 154 can be included in a web application request transmitted by browser application 110 to the local web engine 114 for local files 118.

In one embodiment, local file access code 154 is an encrypted code similar to source security code 152. In this embodiment, common file access codes 154 can be used among different clients 104 so that the server 102 only has to use one local file access code 154 for a particular file type or folder. As such, a small coding file may be placed on the remote files 108 and/or local files 118 for each server and/or client to reference. The local file access code 154 can be encrypted using any of the methods described above or any other encryption method. In one embodiment, one of the authentication portions 161 or use portions 160 of source security code 152 can also perform the function of a local file access code 154. It will thus be appreciated that FIG. 3 and/or FIG. 6 can be modified accordingly to include actions pertaining to this embodiment as well.

In view of the foregoing ways that security can be implemented in the present invention, security code 142 in FIGS. 1A and 1B are representative of any security code stored in engine cache 116 whether it be an encrypted code (e.g., source security code 152), authentication algorithm (e.g., user security code 163), security condition (e.g., local file access code 154), and any item related to ensuring the security between server 102 and local web engine 114 and also between browser application 110 and local web engine 114.

Network Status Module and Synchronizing Module

In another embodiment of the invention, the local web engine 114 provides important storage and execution capabilities that allows the web application to continue running even when the client is offline. Essentially, a web application is able to act like a client application whether it is being executed from server 102 or from client 104 with access to both remote files 108 and 144 and local files 118. Because of this ability to access remote and local files, the web application can operate when the client is offline. This provides a seamless transition between online and offline operations.

When the server 102 and client 104 become disconnected, the server 102 somehow needs to tell the client how to run various web pages even when the client 104 is offline. For those web pages that are dynamically created based on user selections or input. The server 102 needs to be able to instruct client 104 how to generate these pages when the client 104 is offline. As discussed above, local web engine 114 can cache web applications 136 and/or web document code 140. In addition, executable code 138 can be stored to provide instructions on how to operate web application 136 and/or web document code 140 when client 104 is offline. Local web engine 114 can also store remote files 144 in engine cache 116.

When network status module 132 detects that the client 104 is offline, the network status module 132 determines which web applications are operating on the client 104 and begins to utilize web application 136, executable code 138, and/or web document code 140 stored in engine cache 116 particular to the web application. Local web engine 114 begins executing these items relating to the web application, allowing the web application to continue operating while client 104 is offline. In this manner, local web engine 114 can basically function as a clone of server 102 while client 104 is offline. Because executable code 138 includes instructions on how to generate or treat web pages when the client 104 is offline, web pages can continue to operate as intended. In addition, because remote files 144 are stored locally in engine cache 116, the user can continue to use and manipulate remote files 144 while client 104 is offline. The local web engine 114 thus stores enough of the application code to keep the web application running offline.

As discussed above, a local file access module 128 is installed on the client that allows one or more web applications to access local files 118 and handle local files through the web application in the same manner that a user is able to for remote files 108. When client 104 is offline, local web engine 114 implements substantially the same process to allow the web application operating on the client 104 to access remote files 144 and/or local files 118 stored locally. That is, requests from browser application 110 for remote files 108 are redirected to engine cache 116 to access remote files 144. In this manner, the web application is still able to handle both local files 118 and remote files 144 when the client 104 is offline.

The network status module 132 detects when the client 104 reestablishes a connection with server 102. When client 104 is online, the client 104 can seamlessly connect back to a network with server 102. When the client 104 comes back online, the synchronizing module 134 synchronizes the locally cached remote files 144 with remote files 108.

Figure 6:
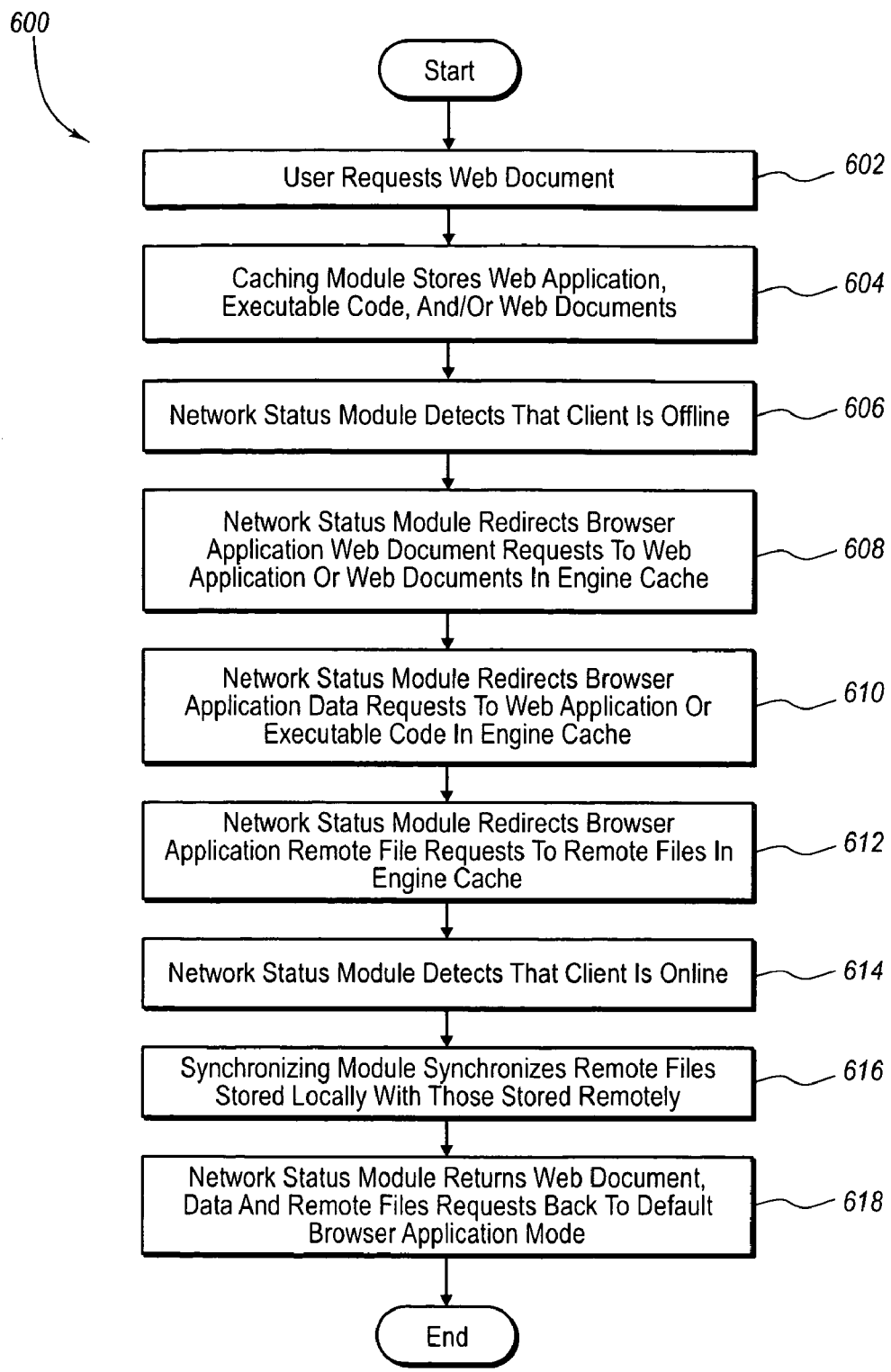
FIG. 6 illustrates an exemplary method for an offline usage scenario.

FIG. 6 illustrates an exemplary method 600 for allowing the client 104 to operate a web application when offline. At 602, a user accesses a web document either remotely or locally. If the web document is executed locally the browser application 110 can make requests to server 102 to access remote files 108. While the user is accessing the web document or other web documents, at 604, caching module 126 can be storing web application 136, executable code 138, web document code 140, security code 142 and/or remote files 144 as directed by the accessed web document or by other caching protocol (e.g., prefetching mechanisms). Note that the executable code 138 in this embodiment relates to web application functionality while offline, although executable code could also be cached relating to other functions.

At 606, network status module 132 detects that client 104 is offline. At 608, network status module 132 redirects web document requests from browser application 110 to locate a web application 136 and/or web document code 140 from engine cache 116 instead of from server 102. Generally, engine cache 116 stores all of the necessary web application 136 or web document code 140 in order to allow user to view substantially the same content available by having a network connection.

Thus, at 610, network status module 132 redirects data requests from browser application 110 to engine cache 116 instead of server 102 in order to use executable code 138 that provides instructions on how to handle particular data requests. As mentioned above, engine cache 116 stores executable code 138 which can provide additional instructions as to how a particular web document is to be handled in the event of an offline scenario. The following illustrates this example. In one embodiment, the web document is a web page through which a user can view her email messages. The browser application 110 would normally request data from remote server 102 for a web document code 140 to be dynamically updated. For example, the web application executes a "check new messages" request to server 102 to determine if there are new messages at remote server 102. If the diet 104 is online, the data request is delivered to server 102, and if there are new messages, the server 102 responds with update data of whether new messages exist. In the prior art, when client 104 is operating offline and a "check new messages" data request is made, the browser application 110 is still going to try to send the request to server 102. Because the network connection does not exist, the request will come back as an error. However, in this invention, network status module 132 causes the data request to be redirected to engine cache 116 for executable code 138 that instructs the browser application 110, when the "check new messages" request is made, to return a "false," instead of an error. In other words, the inbox folder will not be updated and simply reflect the most recent state of the inbox before the client 104 went offline.

At 612, network status module 132 redirects requests for remote files 108 from browser application 110 to locate corresponding remote files 144 in engine cache 116. As discussed above, a local file access module 128 is installed on the client 104 that allows one or more web applications to access local files 118 and handle local files through the web application in the same manner that a user is able to for remote files 108. When client 104 is offline, network status module 132 implements substantially the same process to allow the web application operating on the client 104 to access remote files 144 stored locally. That is, browser application 110 requests for remote files 108 are redirected to engine cache 116 to access remote files 144. In this manner, the web application is still able to handle both local files 118 and remote files 144 when the client 104 is offline.

At 614, network status module 132 detects when the client 104 reestablishes a connection with server 102. At 616, when client 104 comes back online, synchronizing module 134 synchronizes the locally cached remote files 144 with remote files 108. At 618, network status module 132 returns web document, data and remote files requests back to the browser application 110 default mode.

It will be appreciated by those of skill in the art that the exemplary processes described above with regard to FIG. 7 are provided by way of illustration and not by way of limitation and that process elements, steps and/or actions can be rearranged in order, combined and/or eliminated and that other actions may be added due to design considerations depending on the desired offline scenario functionality of client 104.

Having discussed in detail the elements of FIG. 1A, it will be appreciated by those of skill in the art that the exemplary embodiment illustrated in FIG. 1A is provided by way of illustration and not by way of limitation and that modules or components in local web engine 114 and/or engine cache 116 can be rearranged in order, combined and/or eliminated and that other modules or components may be added due to design considerations depending on the desired functionality.

Alternative System Configuration

FIG. 1B illustrates another embodiment of a system 100B for providing server/client web application interactions. While FIG. 1B is substantially similar to FIG. 1A, wherein like elements are referred to with like reference numerals, some of the elements have been removed, added, and/or rearranged. Thus, those elements that are the same or similar will not be repeated in detail here.

In the embodiment of FIG. 1B, a client/web application 172 is installed on client 104 and stored in engine cache 116. Client/web application 172 includes web application 136 that can be the same or different than web application 106 because the web application may be altered for use with single-client operations. Client/web application 172 also can include executable code 138 that allows the client/web application 172 to operate as a locally enabled application even when client 104 is offline. Executable code 138 can further provide instructions on how client/web application 172 should treat certain situations where the client/web application 172 would normally require a network connection with server 102.

In addition, executable code 138 can be used to change the functionality of browser application 110. In one embodiment, browser application 110 may include hooks that respond to executable code 138. For example, a button or icon on browser application 110 may seek executable code 138 to perform a particular function. In one embodiment, the button or icon could be related to a "home page" related to each particular client/web application 172. When the button or icon is selected, it seeks executable code 138 relating to the particular client/web application that is operating that provides a predefined or preferred URL to display as the home page of the client/web application 172.

Client/web application 172 also can include local file access code 154 and security code 142. Local file access code 154 allows the client/web application to access local files 118 of client 104. As discussed above, local file access code 154 allows a client/web application 172 to access local files 118. Local file access code 154 is representative of the combined functions of local file access code 154 and local file access module 128 in FIG. 1A. It will be appreciated that in this embodiment, local file access code 154 could, but does not have to be, downloaded by caching module 126. For example, local file access code 154 could be embedded in client/web application 172 and downloaded therewith.

In addition, security code 142 can be used as discussed above with regard to system 100A to maintain secure access to client/web application 172.

It will be appreciated that the components of client/web application 172 can be integrally combined into the same client/web application 172 as illustrated by the dashed box 172. Alternatively, one or more components can be coded separately and downloaded separately, but still function in combination with other components to form client/web application 172.

Client/web application 172 can operate with a connection to server 102, communicating as necessary with web application 106 and/or obtaining remote files 108. In addition, client/web application 172 can operate with other programs on server 102 or other servers. Because client/web application 172 can be run both online and offline, the user has access to all of the functionalities of the web application in either case.

In one embodiment, interaction with server 102 can occur through a browser application 110 through which client/web application 172 is displayed. Client/web application 172 can be requesting data from remote server 102 through browser application 110. Thus, for example, when client/web application 172 is a search application, client/web application 172 can be performing a search on local files 118 and browser application 110 can be requesting a search on remote files 108 using, in one embodiment, a web application specifically designed to perform online searches. Client/web application 172 is then configured to compile the local search results and remote search results into a combined search so that the user can view all of the search results together. Because client/web applications 172 are similar to web application 106, remote web applications 106 can be easily integrated with client/web applications 172.

Further, local web engine 114 contains the necessary components to execute client/web application 172 locally at client 104. In this manner, local web engine 114 services client/web application 172 instead of server 102. The user has essentially the same user experience with client/web application 172 that the user had with web application 106. As in conventional web application environments, browser application 110 has the ability to execute multiple threads of various client/web applications 172 simultaneously. Thus, client/web application 172 may be configured to be executable without requiring a network connection to server 102. In one embodiment, network status module 132 detects a client's connection status with server 102 so that local web engine 114 can initiate appropriate functionality in an offline scenario. In addition, synchronizing module 134 will periodically synchronize remote files 144 on client 104 with remote files 108 on server 102.

In one embodiment, network status module 132 and synchronizing module 134 occur as a background application independently of a web application. For example, network status module 132 can be continually monitoring the network connection between server 102 and client 104 regardless of whether any web applications are running on client 104. In addition, synchronizing module 134 can be synchronizing data for remote files 144 related to web applications 106 or 136 that are not currently being executed by local web engine 114. This may occur where a user accesses remote files 108 through a different computer (e.g., a work computer) and the client 104 is a home computer and wishes to maintain synchronized remote files 144 in the event of a network failure between server 102 and client 104. Thus, certain functions can occur without the user initiating the function.

These types of functions that can be initiated independent of a web application, but in some cases may operate in cooperation with a web application are herein referred to as "background agents" referred to by reference numeral 174. Background agents automate processes of discovering, invoking, composing, and monitoring Web resources that offer particular services and have particular properties. Other background agents 174 are exemplarily illustrated in FIG. 1B. It will be appreciated that the background agents 174 are only exemplary of the type of background agents that can be operating on local web engine 114 and that a particular embodiment can eliminate or add various background agents 174 depending on the desired functionality of local web engine 114.

Polling module 174 periodically polls the server 102 or another server for updates to client/web application 172. This can be triggered at periodic times or at predetermined times, e.g., immediately after a user enters data for a client/web application 172. In one embodiment, synchronizing module 132 and polling module 176 may be part of the same application that performs these dual functions.

A data tap module 178 monitors all traffic through local web engine 114 and/or client 104. The data tap module 127 can provide statistical reports and other information.

A search module 180 can perform a search on remote files 108, 144 or local files 118 while other applications are running. For example, in one embodiment, a search module 180 can continue to perform a local search for a particular alphanumeric sequence. If the user creates a text file containing that alphanumeric sequence and saves it, the search module 180 locates the new text file. The search module 180 sends a message to an alert application 190 that displays an alert dialogue box on the user interface of client 104 to notify the user of the new search result. The alert dialogue box can also provide a hyperlink to access the new search result. Searching can be linked with popup advertisements or other advertising schemes that use a user's search terms for generating targeted advertising.

The alert application 190 is an example of an application or service that is initiated by the local web engine 114. The alert application 190 can similarly be used for various notices to a client, such as new software updates, system updates and the like. For example, in another embodiment, a system status module 182 can monitor system processes of client 104. System status module 182 can activate alert application 190 when the client 104 hard drive is full, to remind the user to perform a system backup, and the like.

In another embodiment, a download module 184 can download information of general interest. For example, the client 104 connects to a server 102, using the locality of the client 104, the download module 184 can be downloading information such as telephone indexes or addresses.

In yet another embodiment, an indexing module 186 can index information in engine cache 116.

Further, a network module 188 can use peer-to-peer or mesh computing technology to identify other local web engines 114 on a local network. The network module 188 can place a query on the network of other clients having a local web engine 114 to see if any of them allow file sharing. Other clients allowing permission can expose contact lists, photo galleries, or other file databases or libraries accessible for sharing.

Figure 7:
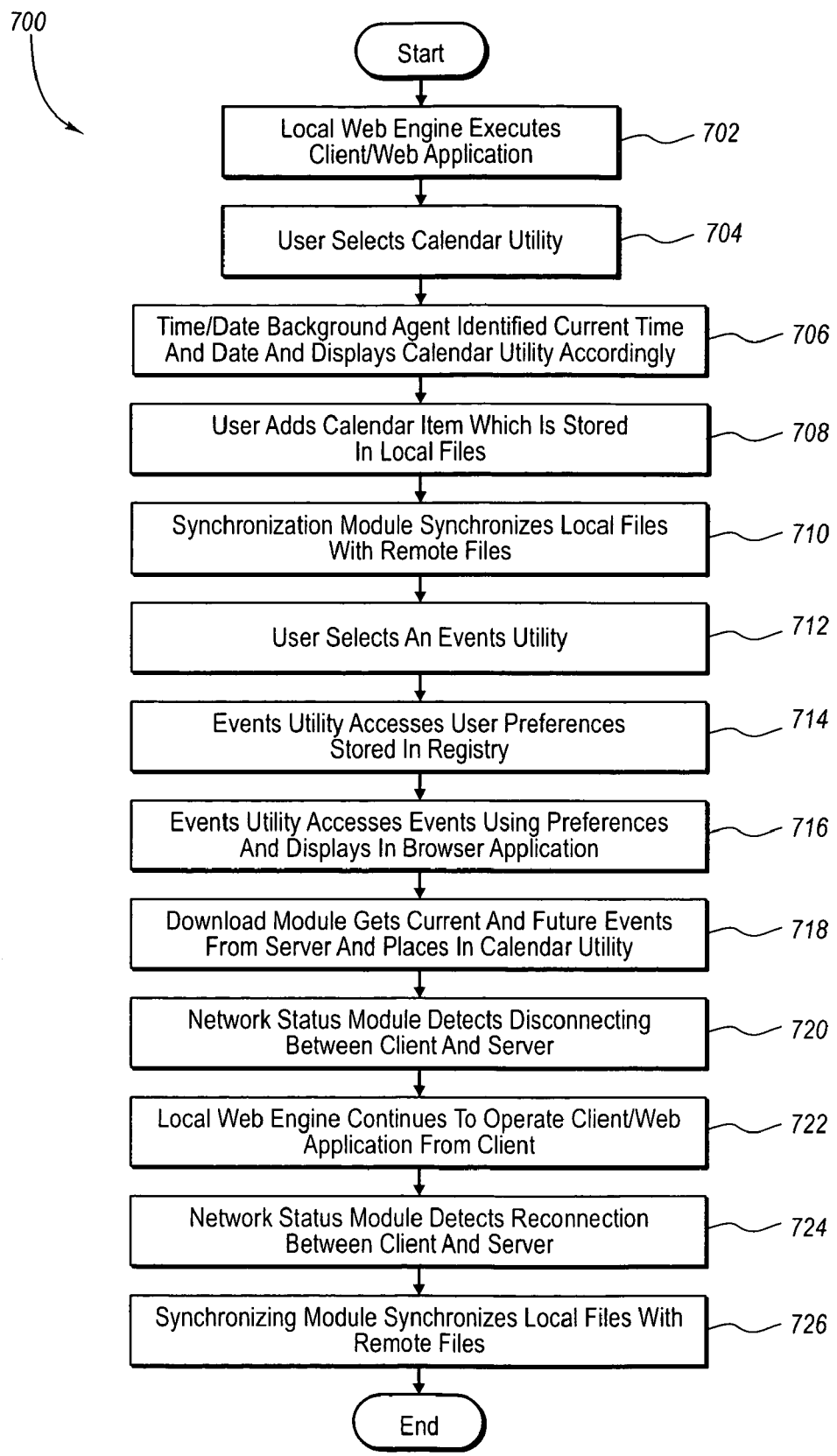
FIG. 7 illustrates an exemplary method for using a client/web application.

FIG. 7 illustrates an exemplary method 700 for using the embodiment of FIG. 1B. At 702, a user initiates a client/web application 172 which is executed by local web engine 114 and displayed in browser application 110. Even though client/web application 172 is driven by local web engine 114, local web engine 114 can access server 102 through browser application 110. In this example, the client/web application 172 is an events application which maintains a user calendar and provides event information about various locales. At 704, the user can click on a calendar utility in the client/web application 172. At 706, a time/date background agent, not shown, identifies the current data and inserts the date into the calendar utility. At 708, the user adds an event to the user's calendar, wherein client/web application 172 saves the calendar item in local files 118. At 710, synchronization module 134 synchronizes remote files 108 to reflect this change in the local files 118.

At 712, the user clicks on an events utility in client/web application 172. At 714, the events utility accesses user preferences stored in registry 118. Because the preference is stored locally, the client/web application 172 knows where to find preference data and it will be specific to the user. Knowing what the user's preference city is, at 716, the events utility displays the events for the user's preference city. A user can update the registry 118 at any time.

At 718, a download module 184 contacts server 102 to identify current and future local events. Download module 184 can place suggested events in the user's calendar utility. The suggested events can be displayed in a different shade or highlighting to distinguish from the user's confirmed events. The user has the option to confirm a suggested event to be maintained permanently in the user's calendar.

At 720, network status module 132 detects that the connection between server 102 and client 104 has become severed. At 722, local web engine 114 continues to operate client/web application 172 locally at client 104, accessing executable code 138 as needed to address situations in which a network connection is required. At 724, network status module 132 detects that the connection between server 102 and client 104 has been reestablished. At 726, synchronizing module 134 synchronizes local files 118 and/or remote files 144 with remote files 108.

In view of the foregoing exemplary process, client/web applications 172 can be run on client 104 with the ability to be updated using a client/server connection. However, even when the client 104 is offline, the client/web application 172 can continue to function smoothly and efficiently because of local web engine 114.

It will be appreciated by those of skill in the art that the exemplary processes described above with regard to FIG. 7 are provided by way of illustration and not by way of limitation and that process elements, steps and/or actions can be rearranged in order, combined and/or eliminated and that other actions may be added due to design considerations depending on the desired functionality of client/web application 172. For example, once the user preferences are established in registry 118, an icon or button may be provided in browser application 110 that selects an event page that relies on the selection of a user preference city. Selecting the icon or button on browser application 110 retrieves a web document from server 102 that goes directly to the server 102 without going through local web engine 114.

Intermediary Application

While the present invention has been described in terms of a single server 102 and single client 104, multiple servers 102 and multiple clients 104 may implement the teachings of the present invention. In addition, an intermediary proxy server may connect multiple clients 104 and then communicate with a server 102. In the intermediate proxy server embodiment, one or more components of local web engine 114 and/or engine cache 116 may reside on the intermediate proxy server which can then be accessed by one or more clients 104. Each client 104, thus, is not required to include the local web engine 114 and/or engine cache 116, but can, in some cases, be serviced completely by the intermediate proxy server. When the server 102 and intermediate proxy server become disconnected, the clients 104 can continue to operate web applications by virtue of aspects of local web engine 114 and/or engine cache 116 residing on the intermediate proxy server and/or clients 104.

Exemplary Computing Environment

The present invention extends to both methods and systems for client/server web application configurations. The embodiments of the present invention may comprise a special purpose or general-purpose computer including various computer hardware, as discussed in greater detail below. Embodiments within the scope of the present invention also include computer-readable media for carrying or having computer-executable instructions or executable codes stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or executable codes and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, modules, executable codes, etc. that perform particular tasks or implement particular abstract data types. Computer-executable instructions, associated executable codes, and program modules represent examples of the program code means for executing steps of the methods disclosed herein. The particular sequence of such executable instructions or associated executable codes represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network system having a server that hosts a web-based application for execution on one or more clients, the system configured to allow a client to execute the web-based application locally at the client when the connection between the client and the server is offline, the client comprising:
   a browser application configured to send requests to access one or more web documents of a web-based application hosted on a server when the client and server are online;
   a control command detecting module configured to detect control commands embedded in one or more web documents requested by the browser application and transmitted from the server to the client, the control commands being embedded such that the control commands do not interfere with execution of the one or more web documents by the browser application, the control commands instructing the client to cache at least one of a web application, executable code, web document, security code, or remote files;
   a caching module configured to store the at least one of a web application, executable code, web documents, security code, or remote files;
   a network status module configured to:
      detect when the connection between the client and the server is offline or online,
      when the client and server are offline, redirect web document requests directed at the server to the at least one of a web application, executable code, web documents, security code, or remote files stored locally at the client, and
      when the client and server reconnect, redirect web document requests directed at the at least one of a web application, executable code, web documents, security code or remote files stored locally at the client, back to the server;
   a synchronizing module configured to synchronize files stored locally at the client with files stored remotely at the server when the client and server become online;
   at least one storage device for storing computer-executable instructions for the browser application, control command detecting module, caching module, network status module, and synchronizing module; and
   at least one processor for executing the computer-executable instructions for the browser application, control command detecting module, caching module, network status module, and synchronizing module.

2. The system as recited in claim 1, wherein the web application or web document is modified from the web application or web document located at the server to include instructions on how to handle requests from the client that require connection to the server.

3. The system as recited in claim 1, wherein the executable code provides the instructions on how to handle requests from the client that require connection to the server.

4. The system as recited in claim 1, wherein the control commands comprise at least one of:
   a caching command to cache one or more manifest items in the one or more web documents transmitted from the server;
   an execution command to execute one or more manifest items in the one or more web documents transmitted from the server; or
   a cache behavior command to control a browser cache or another cache existing on the client.

5. The system as recited in claim 4, wherein the one or more web documents transmitted from the server manifests the one or more items using at least one of:

embedding the manifest one or more items in the one or more web documents transmitted; or referring to pathfile on the server at which the one or more manifest items can be access.

6. The system as recited in claim 4, wherein the control command detecting module is further configured to strip the control command and the one or more manifest item from the one or more web documents transmitted from the server.

7. The system as recited in claim 1, further comprising: a browser cache.

8. The system as recited in claim 7, wherein the caching module is configured to store the at least one of a web application, executable code, web documents, security code, or remote files in another cache separate from the browser cache.

9. The system as recited in claim 1, further comprising at least one of:
 a local file access module for controlling whether an incoming web application or web document allows access to local files stored on the client; or
 a security module for authenticating transmissions between the server and the client or within the client itself.

10. In a network system having a server that hosts a web-based application for execution on one or more clients, the system configured to allow a client to execute the web-based application locally at the client when the connection between the client and the server is offline, the client comprising:
 a browser application configured to send requests to access one or more web documents of a web-based application hosted on a server when the client and server are online;
 a caching module configured to store at least one of a web application, executable code, security code, or remote files locally at the client, wherein the at least one of a web application, executable code, security code, or remote files were instructed to be stored upon detecting control commands embedded in one or more web documents requested by the browser application;
 a network status module configured to:
  detect when the connection between the client and the server is offline or online,
  when the client and server are offline, redirect web document requests directed at the server to the at least one of a web application, executable code, web documents, security code, or remote files stored locally at the client, and
  when the client and server reconnect, redirect web document requests directed at the at least one of a web application, executable code, web documents, security code or remote files stored locally at the client, back to the server;
 a synchronizing module configured to synchronize files stored locally at the client with files stored remotely at the server when the client and server become online;
 at least one storage device for storing computer-executable instructions for the browser application, control command detecting module, caching module, network status module, and synchronizing module; and
 at least one processor for executing the computer-executable instructions for the browser application, control command detecting module, caching module, network status module, and synchronizing module.

11. The system as recited in claim 10, wherein the web application is modified from the web application located at the server to include instructions on how to handle requests from the client that require connection to the server.

12. The system as recited in claim 10, wherein the executable code provides the instructions on how to handle requests from the client that require connection to the server.

13. The system as recited in claim 10, further comprising: a browser cache.

14. The system as recited in claim 13, wherein the caching module is configured to store the at least one of a web application, executable code, security code, or remote files in another cache separate from the browser cache.

15. The system as recited in claim 10, further comprising a security module for authenticating transmissions between the server and the client or within the client itself.

16. The system as recited in claim 10, further comprising at least one of:
 a polling module for communicating with the server for updates to the web application;
 a data tap module for monitoring transmissions between the server and the client;
 a search module for performing a remote or local search;
 a system status module for monitoring the hardware and software on the client;
 a download module for downloading information from the server to the client;
 an indexing module for indexing information in a browser cache or another cache; and
 a networking module for querying other clients for file sharing.

17. The system as recited in claim 16, further comprising an alert application residing on the client for providing a dialogue box to notify the user of findings of one or more of these modules.

18. The system as recited in claim 10, the caching module further being configured to store local file access code for controlling whether the web application can access local files stored on the client.

19. The system as recited in claim 10, further comprising a search application for searching remote files on the server and searching local files on the client and combining the search results.

20. In a network system, wherein a server hosts a web-based application for execution on a client, the client having a browser application for executing the web-based application, a method for allowing the browser application to execute the web-based application when the client loses communication with the server, the method comprising:
 using a browser application to send requests to access one or more web documents of a web-based application hosted on a server when the client and server are online;
 identifying at least one of a web application, executable code, web document, or remote files located in a local cache at the client, wherein the at least one of a web application, executable code, or remote files were instructed to be stored upon detecting control commands embedded in one or more web documents requested by the browser application;
 detecting when the client loses communication with the server;
 when the client and server are offline, redirecting requests from a browser application to at least one of the web application, executable code, web document, or remote files stored in the local cache;
 displaying at least one of the web application or web document stored in the local cache in the browser application;
 detecting when the client becomes reconnected with the server; and
 when the client and server reconnect, redirecting web document requests directed at the at least one of a web application, executable code, web documents, security code or remote files stored locally at the client, back to the server.

21. The method as recited in claim 20, further comprising using the executable code to provide instructions on how to treat requests that require connection to the server.

22. The method as recited in claim 20, wherein the web application or web document includes instructions on how to treat requests that require connection to the server.

23. The method as recited in claim 20, wherein identifying at least one of a web application, executable code, web document, or remote files located in a cache at the client further comprises:

receiving a web document from a server;
identifying a cache command sent with the web document; and
storing at least one of a web application, executable code, web document, or remote files in the cache at the client.

24. The method as recited in claim 20, further comprising:
maintaining changes occurring in the remote files stored in the local cache;
detecting when the client reestablishes communication with the server; and
synchronizing the changes in the remote files in the local cache with the remote files stored at the server.

* * * * *

UNITED STATES PATENT AND TRADEMARK OFFICE
CERTIFICATE OF CORRECTION

PATENT NO. : 7,594,003 B2  Page 1 of 1
APPLICATION NO. : 11/195327
DATED : September 22, 2009
INVENTOR(S) : Davidson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this

Fourteenth Day of December, 2010

David J. Kappos
*Director of the United States Patent and Trademark Office*